(12) United States Patent
Nunnink et al.

(10) Patent No.: US 9,244,283 B2
(45) Date of Patent: Jan. 26, 2016

(54) SYSTEM AND METHOD FOR EXPANSION OF FIELD OF VIEW IN A VISION SYSTEM

(71) Applicants: Laurens Nunnink, Simpleveld (NL); Carl Gerst, Clifton Park, NY (US); William Equitz, Brookline, MA (US)

(72) Inventors: Laurens Nunnink, Simpleveld (NL); Carl Gerst, Clifton Park, NY (US); William Equitz, Brookline, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/164,526

(22) Filed: Jan. 27, 2014

(65) Prior Publication Data
US 2014/0340758 A1 Nov. 20, 2014

Related U.S. Application Data

(63) Continuation of application No. 13/367,141, filed on Feb. 6, 2012, now Pat. No. 8,646,690.

(51) Int. Cl.
| | |
|---|---|
| G02B 26/08 | (2006.01) |
| G02B 27/10 | (2006.01) |
| G06K 7/10 | (2006.01) |
| G06K 7/14 | (2006.01) |
| H04N 5/225 | (2006.01) |
| H04N 5/232 | (2006.01) |
| G02B 27/14 | (2006.01) |
| G03B 17/56 | (2006.01) |

(52) U.S. Cl.
CPC ............ *G02B 27/1066* (2013.01); *G02B 27/14* (2013.01); *G03B 17/565* (2013.01); *G06K 7/10831* (2013.01); *G06K 7/1491* (2013.01); *H04N 5/2254* (2013.01); *H04N 5/2259* (2013.01); *H04N 5/23238* (2013.01)

(58) Field of Classification Search
USPC .............. 235/462.22, 462.24, 462.35, 462.43
See application file for complete search history.

(56) References Cited

U.S. PATENT DOCUMENTS

| | | | |
|---|---|---|---|
| 4,288,819 A | 9/1981 | Williams | |
| 5,049,740 A | 9/1991 | Pines et al. | |
| 5,161,051 A | 11/1992 | Whitney et al. | |
| 5,532,737 A | 7/1996 | Braun | |
| 5,555,090 A | 9/1996 | Schmutz | |
| 5,627,360 A * | 5/1997 | Rudeen | 235/462.21 |
| 5,760,884 A | 6/1998 | Yahashi et al. | |
| 5,790,181 A | 8/1998 | Chahl et al. | |

(Continued)

FOREIGN PATENT DOCUMENTS

| | | |
|---|---|---|
| EP | 0803916 | 7/1986 |
| EP | 1492357 | 12/2004 |

(Continued)

*Primary Examiner* — Ahshik Kim

(57) ABSTRACT

This invention provides a system and method for expanding the field of view of a vision system camera assembly such that the field of view is generally free of loss of normal resolution across the entire expanded field. A field of view expander includes outer mirrors that receive light from different portions of a scene. The outer mirrors direct light to tilted inner mirrors of a beam splitter that directs the light aligned with a camera axis to avoid image distortion. The inner mirrors each direct the light from each outer mirror into a strip on the sensor, and the system searches features. The adjacent fields of view include overlap regions sized and arranged to ensure a centralized feature appears fully in at least one strip. Alternatively, a moving mirror changes position between acquired image frames so that a full width of the scene is imaged in successive frames.

21 Claims, 12 Drawing Sheets

(56) References Cited

U.S. PATENT DOCUMENTS

| | | |
|---|---|---|
| 5,831,762 A | 11/1998 | Baker et al. |
| 5,856,888 A | 1/1999 | Ross et al. |
| 5,992,744 A | 11/1999 | Smith et al. |
| 6,088,133 A | 7/2000 | Francis et al. |
| 6,135,352 A | 10/2000 | Girotti |
| 6,433,859 B1 | 8/2002 | Nakata |
| 6,501,537 B1 | 12/2002 | Chahl et al. |
| 6,572,017 B1 | 6/2003 | Stoner |
| 6,588,669 B1 | 7/2003 | Claus et al. |
| 6,609,660 B1 | 8/2003 | Stoner |
| 7,303,131 B2 * | 12/2007 | Carlson et al. ........... 235/462.22 |
| 7,306,151 B2 | 12/2007 | Ito et al. |
| 7,543,749 B2 | 6/2009 | Knowles et al. |
| 7,576,925 B2 | 8/2009 | Benayahu et al. |
| 7,626,150 B2 | 12/2009 | Chen et al. |
| 7,792,386 B1 | 9/2010 | Worthington et al. |
| 7,860,273 B2 | 12/2010 | Kochi et al. |
| 7,886,978 B2 | 2/2011 | Ofek et al. |
| 7,999,841 B1 | 8/2011 | Stevens |
| 8,086,072 B2 | 12/2011 | Edwards et al. |
| 8,108,622 B2 | 1/2012 | Nonogaki et al. |
| 8,646,690 B2 * | 2/2014 | Nunnink et al. ......... 235/462.22 |
| 2004/0262394 A1 | 12/2004 | Longacre et al. |
| 2008/0260297 A1 | 10/2008 | Chung et al. |
| 2010/0060651 A1 | 3/2010 | Gala |
| 2011/0080414 A1 | 4/2011 | Wang |
| 2011/0164108 A1 | 7/2011 | Bates et al. |
| 2011/0174881 A1 | 7/2011 | Samek et al. |
| 2012/0000981 A1 | 1/2012 | Meier et al. |

FOREIGN PATENT DOCUMENTS

| | | |
|---|---|---|
| WO | WO8603916 | 7/1986 |
| WO | WO 2010053682 | 5/2010 |

* cited by examiner

SYSTEM AND METHOD FOR EXPANSION OF FIELD OF VIEW IN A VISION SYSTEM

This application is a continuation of U.S. patent application Ser. No. 13/367,141, titled "System and Method for Expansion of Field of View in a Vision System," filed on Feb. 6, 2012, the entire contents of which is incorporated herein by reference.

FIELD OF THE INVENTION

This invention relates to vision systems, and more particularly to systems and methods for expanding the field of view of a vision system camera lens.

BACKGROUND OF THE INVENTION

Vision systems that perform measurement, inspection, alignment of objects and/or decoding of symbology (e.g. bar codes—also termed "IDs") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

A common use for ID readers is to track and sort objects moving along a line (e.g. a conveyor) in manufacturing and logistics operations. The ID reader can be positioned over the line at an appropriate viewing angle to acquire any expected IDs on respective objects as they each move through the field of view. The focal distance of the reader with respect to the object can vary, depending on the placement of the reader with respect to the line and the size of the object. That is, a larger object may cause IDs thereon to be located closer to the reader, while a smaller/flatter object may contain IDs that are further from the reader. In each case, the ID should appear with sufficient resolution to be properly imaged and decoded. Thus, the field of view of a single reader, particularly in with widthwise direction (perpendicular to line motion) is often limited. Where an object and/or the line is relatively wide, the lens and sensor of a single ID reader may not have sufficient field of view in the widthwise direction to cover the entire width of the line while maintaining needed resolution for accurate imaging and decoding of IDs. Failure to image the full width can cause the reader to miss IDs that are outside of the field of view.

There are several techniques that can be employed to overcome the limitation in field of view of a single ID reader, and expand the systems overall field of view in the widthwise direction. For example, one can employ multiple ID readers/cameras focused side by side to fully cover the width of the line. This is often an expensive solution as it requires additional hardware and optics. Alternatively, a line-scan system with inherently wider FOV can be employed. However, this arrangement can also increase costs as it requires more specialized hardware and generally increases complexity. For example, an encoder is often needed to sense relative movement of the line when using a line-scan arrangement. Another technique is to employ a larger sensor, in the single ID reader to provide the desired resolution for appropriately imaging the scene along the widthwise direction. However, the approach again entails additional cost through the use of less-conventional hardware. Moreover, most sensors (e.g. CMOS sensors, but other types, such as CCD, are also contemplated) are commercially available in a standard format, such as 4×3 or 16×9, and thus, providing a larger widthwise resolution also entails a similarly enlarged height (i.e. the direction of line motion) resolution. The increased height direction may cause the sensor to capture the same ID in a plurality of captured image frames as the object passes through the enlarged field of view. This, in turn leads to extraneous processing and/or decoding of the same ID and the risk that a single object is mistaken for a plurality of objects passing under the reader.

It is therefore desirable to provide a system and method for expanding the field of view of an ID reader in the widthwise direction with respect to a moving line in a manner that does not decrease needed resolution. It is further desirable that the system and method allow use of a conventional sensor and camera optics. The system and method should be straightforward to install and use and should desirably avoid increasing resolution in the height/line-motion direction.

SUMMARY OF THE INVENTION

This invention overcomes disadvantages of the prior art by providing a system and method for expanding the field of view of a vision system camera assembly that can be employed as an ID reader such that the field of view is generally free of loss of normal resolution of a camera assembly sensor, and ensures that features of interest, such as IDs, are fully imaged across the entire expanded field. In an embodiment a field of view expander (FOVE) includes outer mirrors directed to receive light from different widthwise portions of a scene, which can be a moving line of objects. The outer mirrors thereafter direct the light to associated vertically tilted inner mirrors of a beam splitter that, in turn, direct the light through an aperture in the FOVE substantially in alignment along an optical axis of the camera to avoid distortion of images. The inner mirrors direct the light from each outer mirror into a discrete strip on the sensor, with one strip stacked above the other, and the vision system searches for and analyzes the overall image for features. The fields of view defined by the mirrors include widthwise overlap regions sized and arranged to ensure a centralized feature appears fully in at least one strip. In alternate embodiments, a moving mirror changes position between acquired image frames so that a full width of the scene is imaged in successive frames.

In an illustrative embodiment, a system and method system for expanding a field of view of a scene imaged by a vision system camera is provided. The camera includes an image sensor, and the system is generally constructed and arranged to search and analyze features of interest in the scene using, for example a vision system process and vision system application that is onboard and/or remotely interconnected to the camera. This sensor can define a roughly square shape, and can (for example) define a wherein the M×N pixel resolution of 1024×768 pixels, 2048×384 pixels and 2048×768 pixels, among other dimensions. The FOVE provides a first outer mirror oriented at an acute angle with respect to an optical axis of the camera and a second outer mirror oriented at an opposing acute angle with respect to an opposing side of the optical axis. A beam splitter is located forward of the first outer mirror and the second outer mirror in a direction taken from the vision system camera. This beam splitter provides a first reflecting surface and a second reflecting surface. The first outer mirror and first reflecting surface are illustratively arranged to direct a first field of view from the scene along the optical axis to the sensor. Likewise, the second outer mirror and second reflecting surface are illustratively arranged to direct a second field of view from the scene along the optical axis to the sensor. The first field of view is at least in part separated from the second field of view at the scene along a horizontal direction. Additionally, the first outer mirror, the second outer mirror and the beam splitter are arranged to project each of the first field of view and the second field of view in a vertically stacked relationship of strips at the sensor.

An illustrative search application that receives image data from the sensor locates and analyzes the overall image for features of interest that can occur in either strip or both strips if the feature is within a predetermined overlap region. This overlap region is illustratively wide enough to fully include in at least one strip, the widest feature to be imaged. In an illustrative embodiment, the features of interest can be barcodes (for example, one-dimensional type barcodes). These exemplary barcodes can be oriented to extend (i.e. in the case of a one-dimensional code—the "one" dimension extends) in the direction of field expansion (e.g. the "horizontal" or "widthwise" direction). In an embodiment, the first outer mirror and the second outer mirror are positioned at offset vertical position. This vertical offset in the outer mirrors corresponds with the vertical positioning of the first reflecting surface and the second reflecting surface, which illustratively define crossing mirrors stacked vertically and defining an approximate crossing line passing approximately through the optical axis. To direct/project the respective field of view from each reflecting surface to a strip (or other geometrical arrangement on the sensor, each reflecting surface also includes an opposing slight vertical tilt inwardly and downwardly toward the optical axis. The object imaged can be one or more side-by-side objects in relative motion with respect to the expanded field of view (e.g. objects on a moving conveyor line).

In another embodiment, a system and method for expanding a field of view of a scene imaged by a camera of a vision system, which includes a vision system processor. The processor (and/or other hardware and/or software) causes the camera's sensor to acquire a plurality of image frames at a predetermined frame rate. A moving mirror projects light from the scene to the camera along the camera's optical axis. The mirror is driven by a drive that operates relative to the frame rate so as to vary an angular orientation of the reflective surface of the mirror with respect to the optical axis. In this manner, image frames are acquired using the moving mirror as it is positioned at each of a plurality of varying angular orientations with respect to the optical axis. As such, the acquired image frames collectively image an area in a horizontal direction that is greater than an area in the horizontal direction imaged in a single one of the image frames. An illustrative search application locates the features of interest in the image frames and outputs data based on the features of interest. These features of interest can be symbology codes, such as one-dimensional barcodes. The moving mirror can be a rotating polygonal mirror, or an oscillating mirror, having an axis of rotation taken perpendicular a horizontal plane that passes through the optical axis of the camera, and generally extends in the (horizontal) direction of field expansion. The illustrative polygonal mirror presents a plurality of sides, each at a slightly different orientation angle with respect to the axis. The light reflected from the scene by each angled side is bounded overall by a defined maximum width of field. These bounds can be provided by outwardly angled side walls positioned on either side of the optical axis (i.e. defining an outwardly tapered frustum shape) between the mirror and scene. An image is acquired at each orientation of the moving mirror surface. These acquired images collectively allow the search application to locate any features in any of the image frames over the extended width of field. Illustratively, the mirror's movement can be synchronized with the frame rate so that the pattern of orientations sides is constant. Alternatively, the mirror's movement can be asynchronous with respect to the frame rate so that a somewhat random pattern of angular orientations collectively images the entire field of view.

BRIEF DESCRIPTION OF THE DRAWINGS

The invention description below refers to the accompanying drawings, of which.

DETAILED DESCRIPTION

Figure 1:
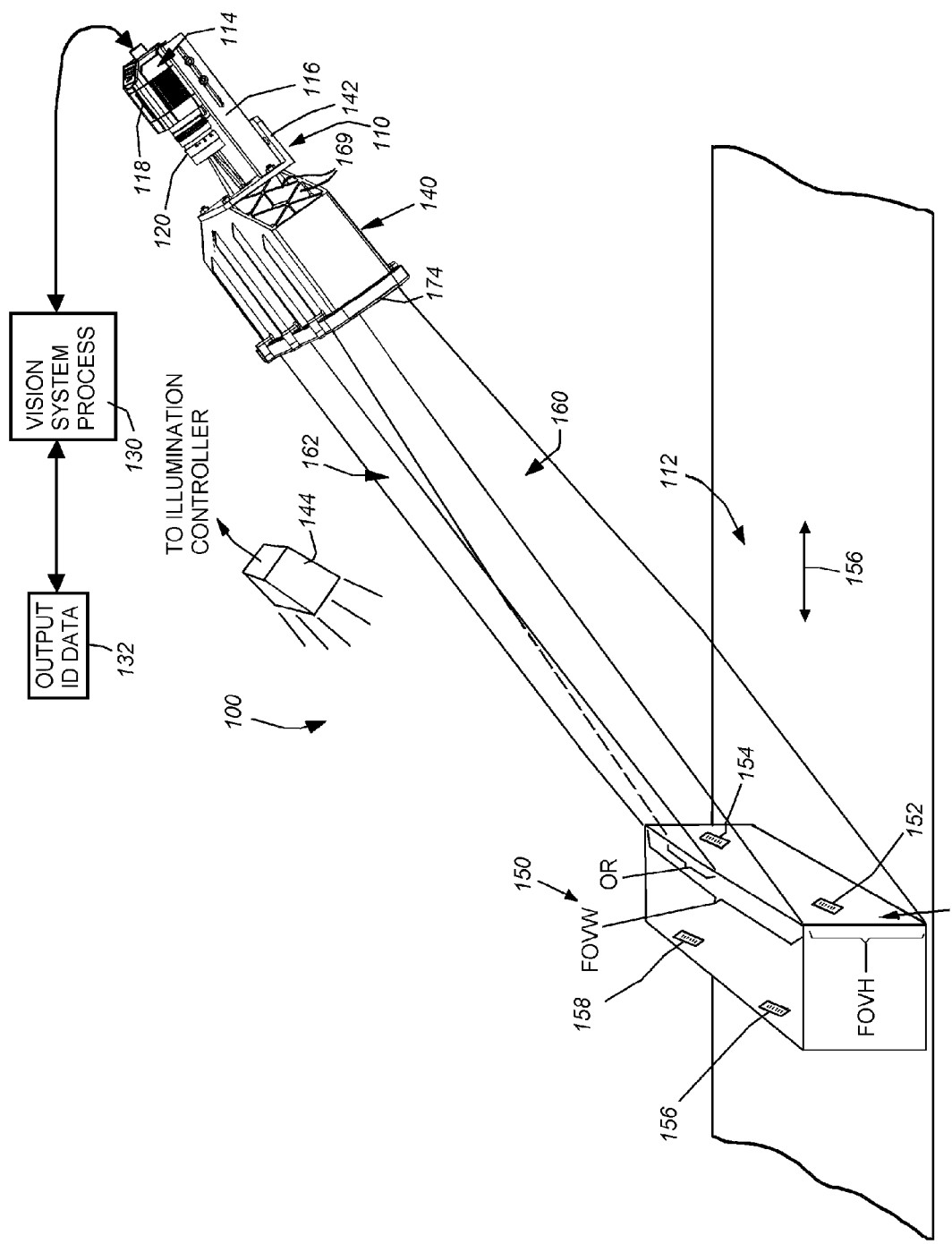
FIG. 1 is a perspective view of a vision system including a field of view expander (FOVE) according to an illustrative embodiment acquiring an image of an exemplary object on a moving line.

FIG. 1 shows a vision system arrangement 100 in which a vision system or ID reader assembly 110 oriented at an acute angle with respect to a moving line represented by a conveyor 112. The vision system 110 includes a camera assembly 114 adjustably mounted in a frame 116. The camera assembly includes the camera base 118 and a lens 120. A variety of camera implementations can be employed in alternate embodiments. In an embodiment, the base 118 includes an internal sensor (described below), having a pixel array for acquiring grayscale of color image data. The size of the array is highly variable. For example, the array can be a conventional rectangular (roughly square) array having a size of 1024×768 pixels. In alternate embodiments, other array sizes, including, but not limited to, 2048×384 or 2048×768 pixels can be employed. The camera base 118 can include an internal vision processor and ID (barcode) decoding circuit. Alternatively, the camera can transmit raw image data to a remote, interconnected (wired or wireless) processing device, such as a networked PC. In either arrangement, a vision system process 130 locates and resolves IDs, and feeds the data to a decoding process that outputs ID information (block 132). The data can be transmitted using a wired or wireless connection to a processing device and/or a process, such as a label printer, alarm or gating system that directs motion of a conveyed object based upon the information contained in the ID.

The imaged scene can be illuminated by an acceptable illumination unit or units. As shown, an exemplary illuminator 144 is mounted above the scene using a bracket (not shown) or other mounting arrangement. The illuminator(s) can be mounted separately from the reader assembly 110 as shown, and/or as an integral part of the assembly (for example as a ring illuminator arranged around the FOVE). The illuminator(s) are operatively connected to an illumination controller that can be triggered by the ID reader assembly 110 (e.g. the camera base processor) or by another processor (e.g. a PC interface).

The lens 120 can be any acceptable lens type, such as a fixed-magnification or variable-magnification (zoom) lens. The lens mount can be a conventional C-mount, F-mount, etc, or a custom mount, or a fixed lens. Alternate lens types, such as liquid lenses can also be employed. The lens 120 is positioned to receive light from a field of view expander (FOVE) 140 fixedly mounted with respect to the camera assembly 114 using an illustrative L-shaped bracket 142 that is the front part of the frame 116. A variety of frame assemblies can be used to physically interconnect the camera assembly 114 to the FOVE 140. In further embodiments, the FOVE can be integrally attached to the camera base and/or lens so that is defines an integral unit. The camera and FOVE are mounted using a bracket arrangement (not shown), such as an overhead bracket, so that the scene is imaged appropriately for the scanning operation. While the camera assembly and FOVE are typically fixed as shown, and objects move through the associated field of view, it is expressly contemplated that the objects or subjects can be fixed, and the camera assembly and FOVE can move on an appropriate track or other structure. Thus, as defined broadly herein, the camera assembly with FOVE and the object(s) are in "relative motion" with respect to each other.

That object 150 is represented, by way of example, by a box having a plurality of IDs (e.g. one-dimensional barcodes) 152, 154, 156 and 158 positioned at discrete locations across the width of the object 150. The object 150 moves (double arrow 156) on the conveyor 156 with respect to a field of view 158 generated by the FOVE 140. The field of view 158 is arranged to cover the width FOVW of the conveyor 112 and/or object 150. Likewise, the height FOVH of the field of view is arranged to image the area of the object expected to contain IDs. While a single object crossing the width of the line is shown by way of example, the term "object" can be taken broadly to comprise a plurality of objects arranged side by side across a width of a line. Likewise an object can be a longer structure (e.g. a web) having a multiplicity of IDs or other features of interest therealong.

In various embodiments, it is desirable to define the field of view so that the height is smaller than the width, and more generally the height is reduced from that provided in a typical 1024×768 pixel sensor. In this manner, any IDs passing into the field of view will reside in a minimal number of image frames, reducing the possibility of a double inclusion of the object in the output data. Illustratively, an ID-reading application can sometimes be more effectively implemented if the sensor defines 2048×384 pixels or 2048×768 (at a lower frame rate) instead of the standard 1024×768. That is, it can be desirable to provide a sensor that is N times as wide, and illustratively one-Nth as tall, as a standard unit. Such an arrangement can be particularly useful in reading the one-dimensional bar codes 152, 154, 156 and 158 in known width-wise orientation across the conveyor 112, as depicted in FIG. 1. Through use of the FOVE according to various embodiments herein a sensor with roughly square aspect ratio can be modified into a "virtual sensor" which is much wider and possibly narrower (but with the same overall number of pixels) so that a wide, but narrow strip across the field of view is imaged. Based upon the structure and function of the FOVE according to various embodiments herein, this strip is imaged in a manner that is free of loss of the resolution per-unit-area of the object when compared to an unmodified sensor without (free of) the FOVE.

More particularly, and as shown in FIG. 1, the effect of the FOVE 140 of the illustrative embodiment is to provide the two depicted fields of view 160 and 162 that cover the width of the object 150 and/or conveyor 112 with a sufficient height to fully image an ID (barcode) within a given acquired image frame. The overlap region OR is variable and ensures that the largest expected feature is within one or both of the defined fields of view 160, 162. In this example, the size of the overlap region OR is larger than the largest ID (e.g. center ID 158) so that this feature is fully imaged.

Figure 1A:
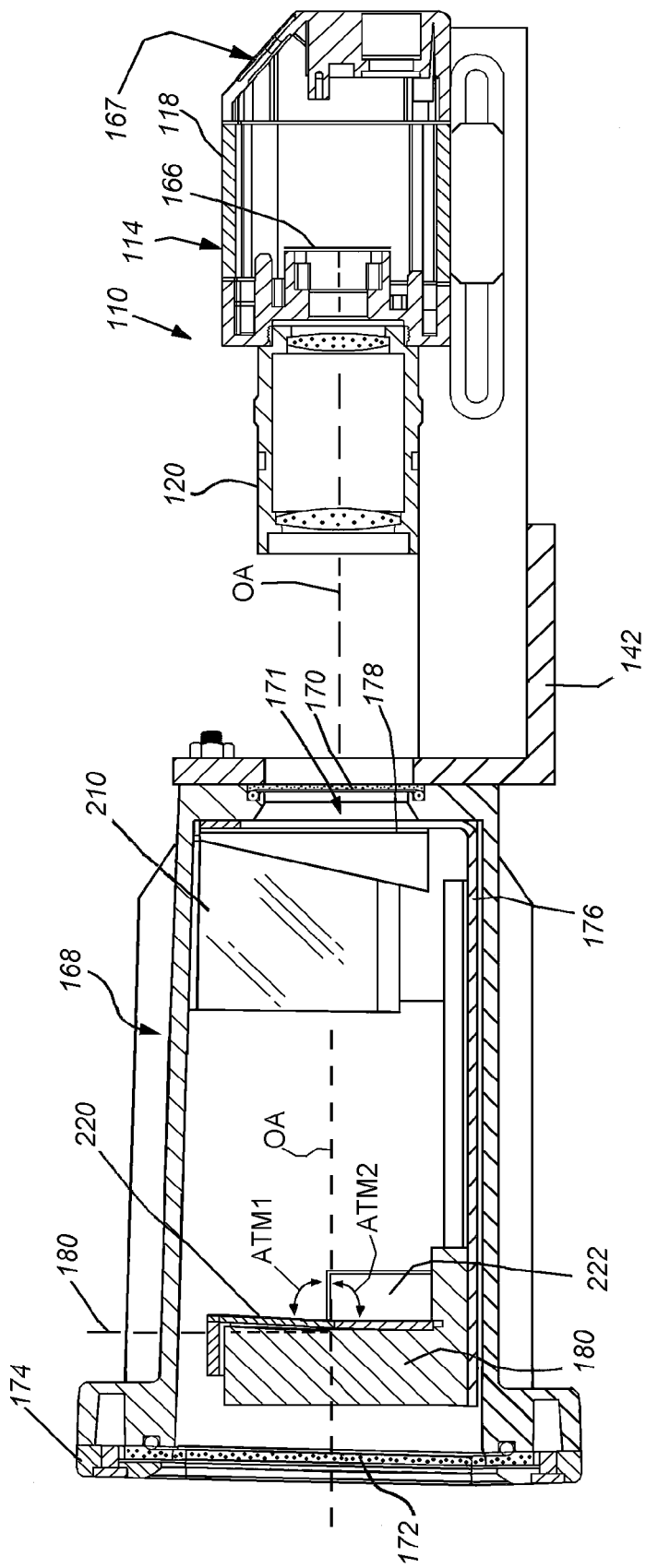
FIG. 1A is a side cross section of the vision system and FOVE of FIG. 1.

With further reference to FIG. 1A, the internal structure of the FOVE 140 and an exemplary vision system camera assembly 110 is shown in cross section. The camera base 118 includes a sensor 166 in optical communication with the lens 120 and FOVE 140. The sensor is interconnected with on-board and/or remote processing components (not shown) as described generally above. The rear panel 167 of the camera base 118 includes various interface controls and connectors in an illustrative embodiment.

The FOVE 140 in this embodiment consists of an outer shell 168 illustratively constructed from an appropriate metal, polymer or composite. It can include various ribs (e.g. crossing ribs 169) that stiffen and lighten the shell 168. A transparent window 170 covers and seals the rear aperture 171 of the shell to allow light to pass into the lens 120. The front end of the shell is covered by a front transparent window 172 that is secured by a front bezel 174. The shell encases a support plate assembly 176 that extends along a bottom side of the shell and includes a reinforced upright plate that surrounds the aperture 171 (allowing light to pass therethrough), and is secured to the rear face of the shell. The support plate assembly 176 supports the mirrors employed to expand the field of view in accordance with the illustrative embodiment.

Figure 2:
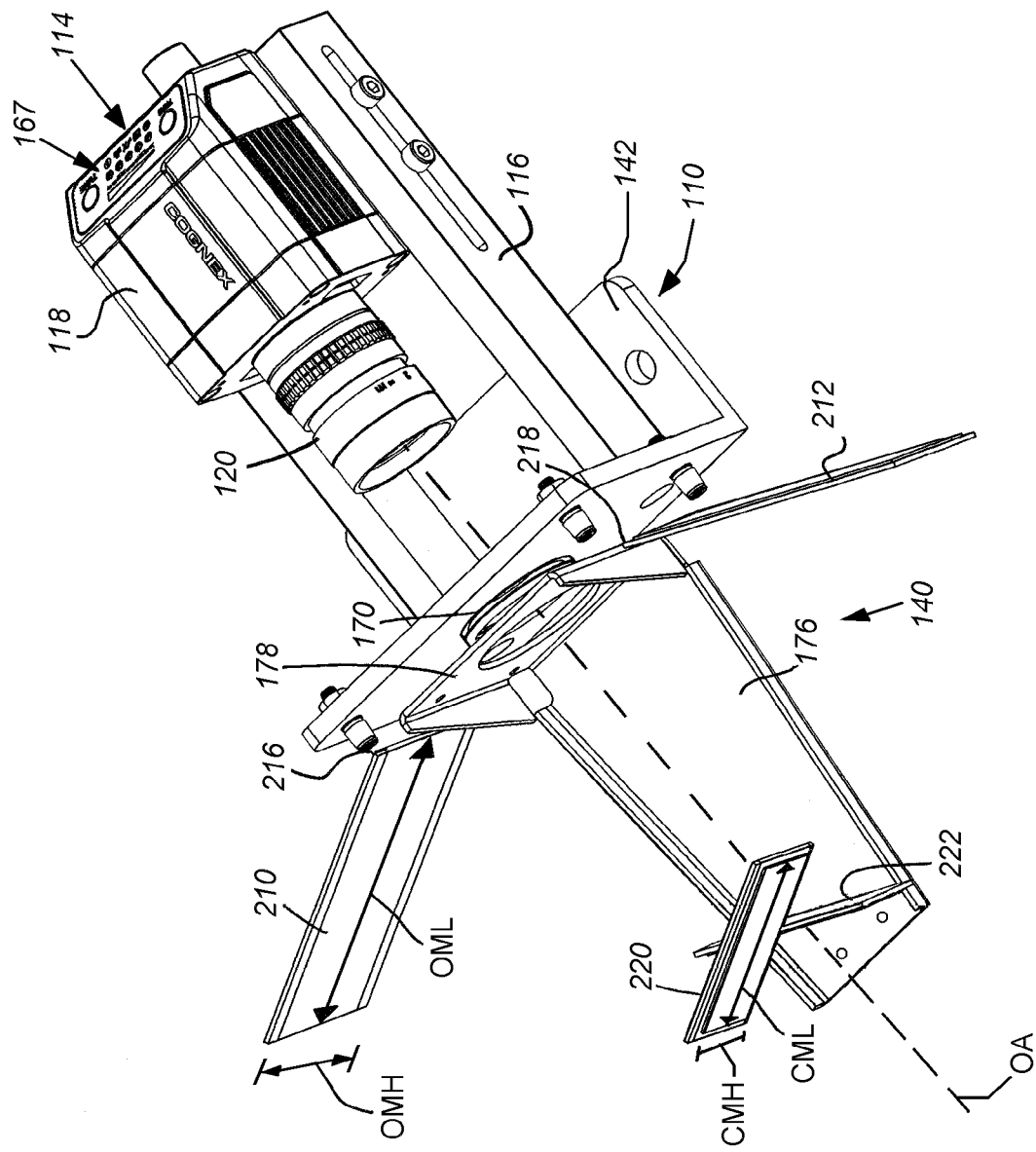
FIG. 2 is a more detailed perspective view of a mirror arrangement in the illustrative vision system and FOVE of FIG. 1 with housing and support components omitted to depict the relative placement of mirrors therein.
Figure 3:
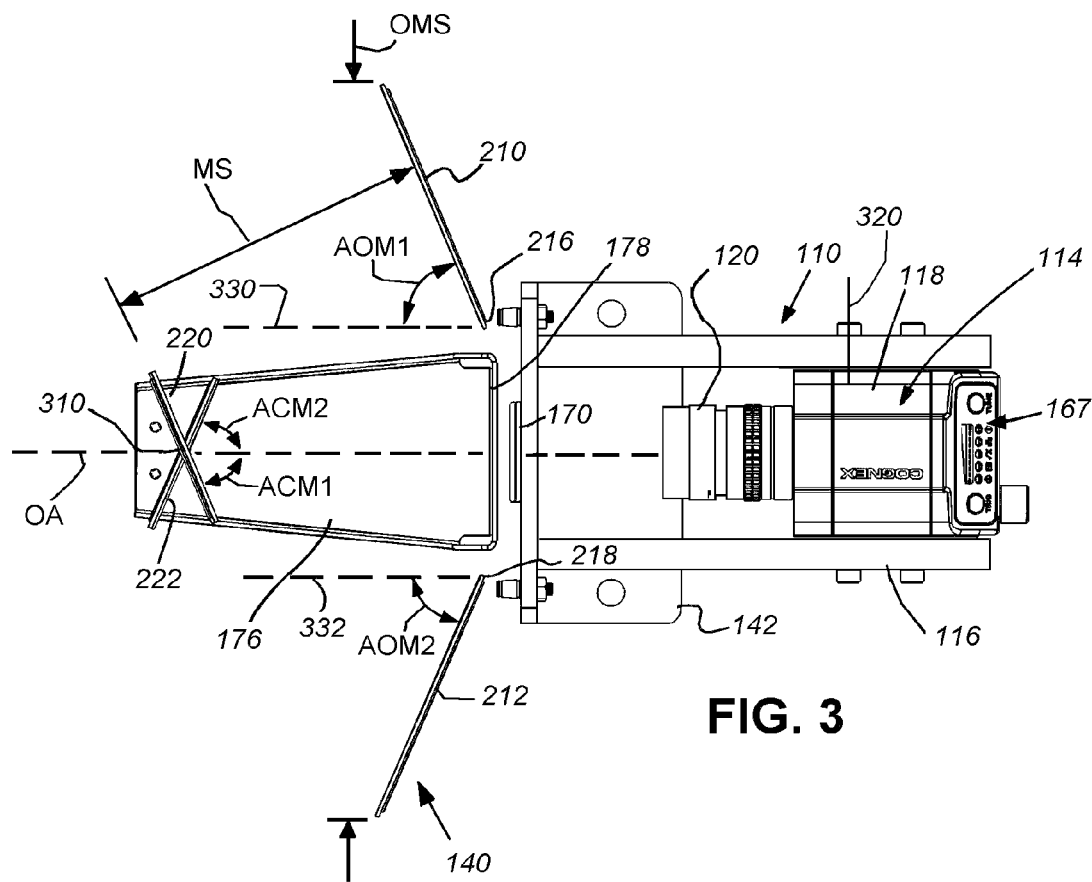
FIG. 3 is a top view of a mirror arrangement in the illustrative vision system and FOVE of FIG. 1 with housing and support components omitted.
Figure 4:
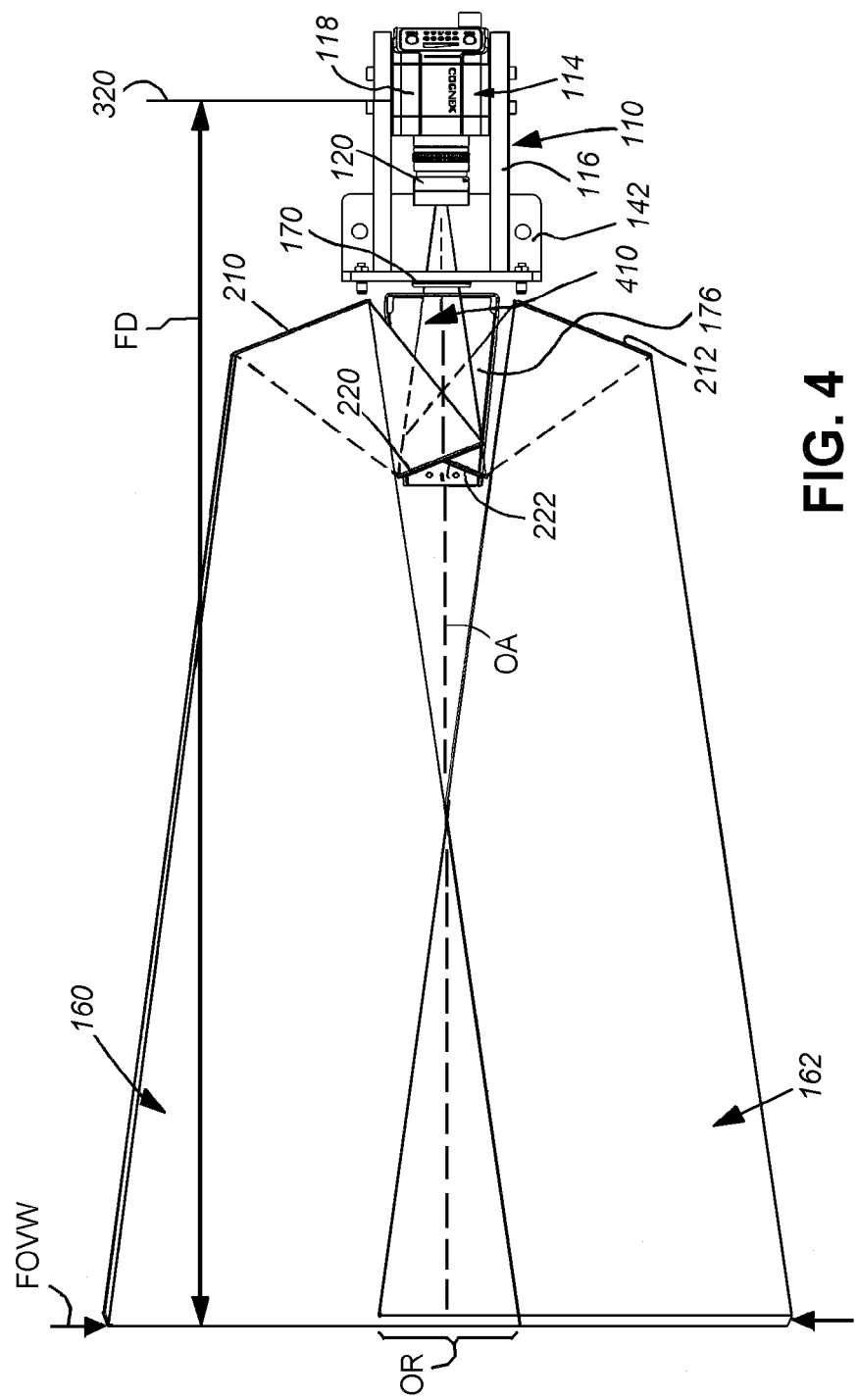
FIG. 4 is a top view of a mirror arrangement in the illustrative vision system and FOVE of FIG. 1 with housing and support components omitted showing the relative angles of received light transmitted from an object, through the FOVE, to the camera.
Figure 4A:
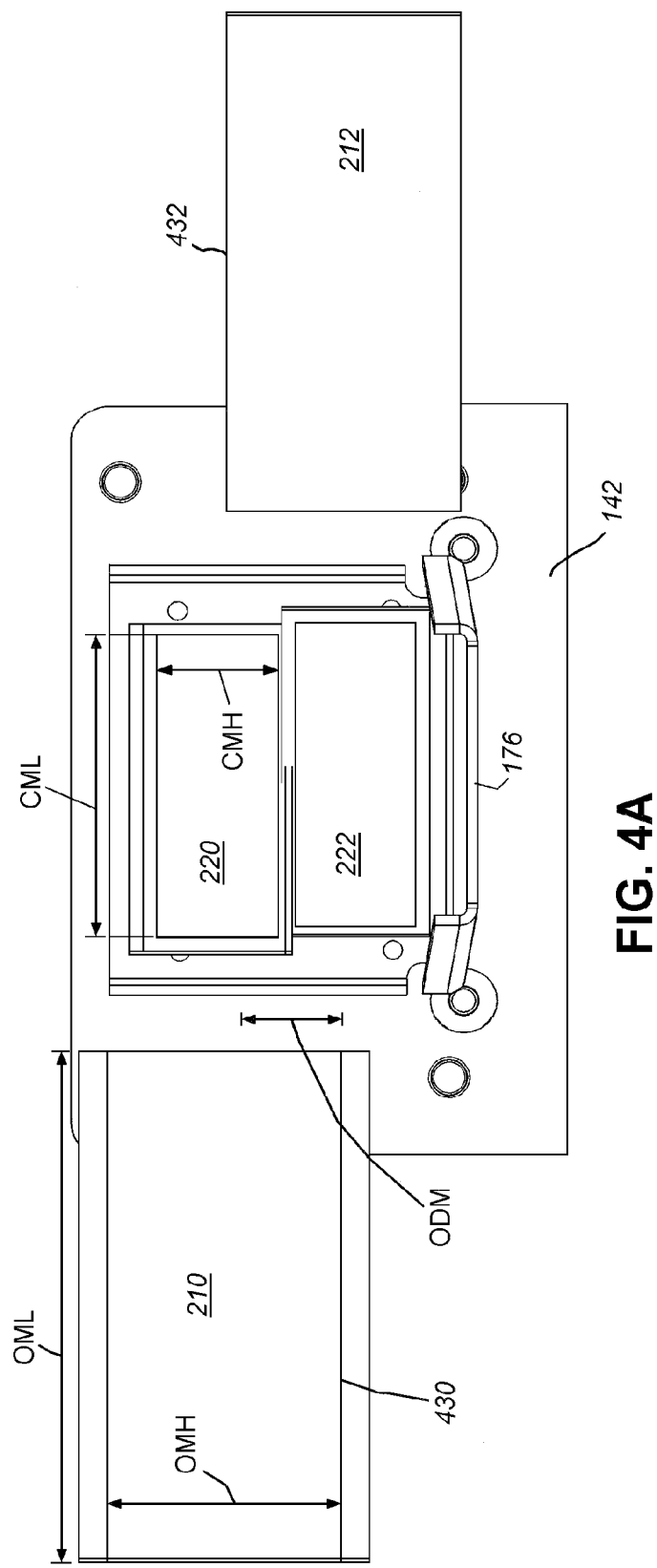
FIG. 4A is a front view of the mirror arrangement of the FOVE of FIG. 1

With further reference to FIGS. 2-4, the placement and function of the mirrors is described in further details. The support plate assembly 176 secures a pair of opposing outer-extended mirrors 210 and 212 that each respectively extend from a position 226 and 218 near each side the rear aperture to a respective side edge of the shell (168 in FIGS. 1 and 1A). Likewise two, vertically stacked, crossing inner mirrors 220 and 222 reside on a mount (180 in FIG. 1A) centered about the optical axis OA. Illustratively, the inner mirrors' crossing line 310 (FIG. 3) is arranged along the axis OA. As described below, the mirrors have a vertical tilt so the crossing 'line" is an approximate region that is generally/approximately vertical and generally/approximately resides around the axis OA. Note also, as used herein various directional and orientation terms such as vertical, horizontal, up, down, bottom, top, side, and the like are used only as relative conventions and not as absolute orientations with respect to a fixed coordinate, such as gravity.

In this embodiment, the outer mirrors 210 and 212 are directed to receive light from a scene through the front window (172 in FIG. 1A). In this embodiment they are each oriented at a respective acute angle AOM1 and AOM2 relative to a line (dashed lines 330 and 232 parallel to the axis OA) in FIG. 3 that generates the desired expanded, overlapping field of view at a given focal distance FD from the sensor image plane 320 (see also FIG. 4). As shown in FIG. 4, the crossing inner mirrors 220 and 222 define, in essence a "beam splitter", which reflects the light transmitted from the outer mirrors 210 and 212 into an overlapping wedge (frustum) 410 that is aligned with the axis OA of the lens and camera and substantially perpendicular to the sensor image plane. This is desirable in that ensure that light received from each field of view is relatively free of distortion when it reaches the sensor. That is, light that reaches the sensor at an angle can provide a distorted image that is moiré difficult to analyze and decode.

To provide an axially aligned image at the lens and sensor, the crossing inner mirrors 220 and 222 are each oppositely angled with respect to the axis OA at respective angles ACM1 and ACM2. In an illustrative embodiment angles AOM1 and AOM2 are in a range of approximately 45 to 75 degrees, and typically 68 degrees, while angles ACM1 and ACM2 are typically in a range of 45 to 75 degrees and typically 68 degrees. Thus, in an embodiment, the crossing inner mirrors of the beam splitter define substantially equal opposite angles with respect to the optical axis. Also, in an illustrative embodiment (referring to FIG. 2), outer mirrors 210, 212 each have a horizontal length OML of between 40 and 120 millimeters, and typically 84 millimeters, and a vertical height OMH of between 20 and 50 millimeters, and typically 33 millimeters. Likewise, the crossing inner mirrors 220, 222 illustratively have a horizontal length CML of between 30 and 60 millimeters, and typically 53 millimeters, and a vertical height CMH of between 10 and 25 millimeters, and typically 21 millimeters. The overall horizontal span OMS of the outer mirrors 210, 212 (referring to FIG. 3) is approximately 235 millimeters in an illustrative embodiment, and the spacing MS between each respective outer and associated inner mirror surface (i.e. 210 and 220; 212 and 222) is approximately 100 millimeters. Based upon the forgoing measurements and with appropriate focus adjustment in a selected camera lens 120, an overall expanded field of view FOVW of approximately 381 millimeters (15 inches) can be achieved at a focal distance FD of approximately 700 millimeters.

While the foregoing angles and dimensions are provided in an illustrative embodiment, these are only exemplary and a wider or narrower field of view that can be achieved. Likewise the measurements can be varied in accordance with skill in the art to achieve similar results and can be either symmetrical (e.g. equal opposing angles and/or equal dimensions) with respect to the axis OA or asymmetrical (e.g. unequal opposing angles and/or unequal dimensions). For example the size of any mirror can be increased or decreased and their angles with respect to the axis OA can be varied as appropriate. Additionally, the mirrors can be constructed from any acceptable specular material that produces the desired optical effect. For example, a silvered glass mirror or an equivalent polymer can be employed. Other specular materials, such as highly polished or coated metals can be used in certain embodiments.

With reference also to the front view of FIG. 4, the outer mirrors 210 and 212 are positioned at a vertical offset with respect to each other, and relative to the overall height of the shell (See FIG. 1A). In this manner, each outer mirror 210, 212 is aligned more vertically with its associated inner mirror, 220, 222. In an illustrative embodiment the offset distance ODM between the bottom edge 430 of the higher outer mirror 210 and the upper edge 432 of the lower outer mirror 212 is approximately 16 millimeters. This dimension can be varied in alternate embodiments depending, in part on the overall height of the outer mirrors and FOVE shell.

With reference again to FIG. 1A, the upper inner mirror 220 defines a tilt off the vertical (i.e. a vertical that is perpendicular to the axis OA shown by dashed line 180) that orients this mirror 220 tilt slightly downwardly and inwardly relative to the axis OA. The tilt is represented by an acute (slightly non-perpendicular) angle ATM1 which is approximately 88 degrees (and more particularly 87.9 degree) in an illustrative embodiment. Likewise, the lower inner mirror 222 tilts slightly inwardly and downwardly by an opposing angle ATM2 of approximately is approximately 88 degrees (and more particularly 87.9 degrees) with respect to the axis OA in an illustrative embodiment. The overall geometry of the mirrors resolves the two side-by-side overlapping fields of view into a pair of slightly overlapping, strips that are received by the lens and sensor as a stacked pair of views. As described above the stacked images are substantially axially aligned with the optical axis OA along the horizontal plane, and slightly angled with respect to the vertical plane (due to the tilt of the crossing mirrors) resulting in a relatively distortion-free image.

In an illustrative embodiment, the mirror arrangement of the FOVE, in accordance with the exemplary geometry and dimensions described above, is generally rotationally symmetric with respect to the optical axis OA.

Figure 5:
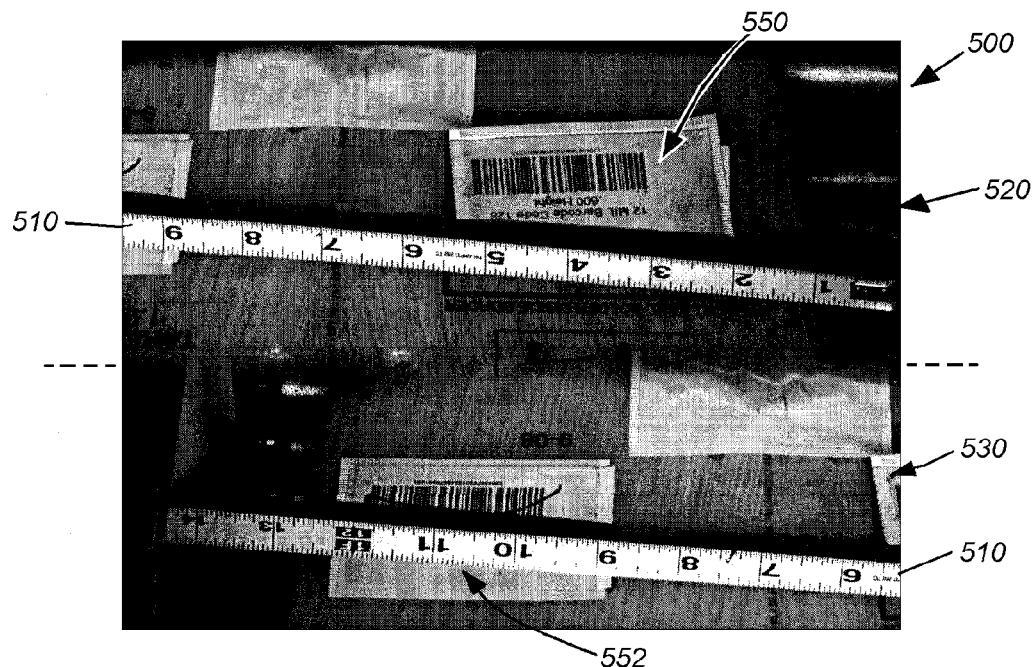
FIG. 5 is a depiction of an acquired image of an exemplary object including a pair of exemplary IDs each respectively located within each discrete field of view portion of the illustrative vision system and FOVE of FIG. 1.
Figure 6:
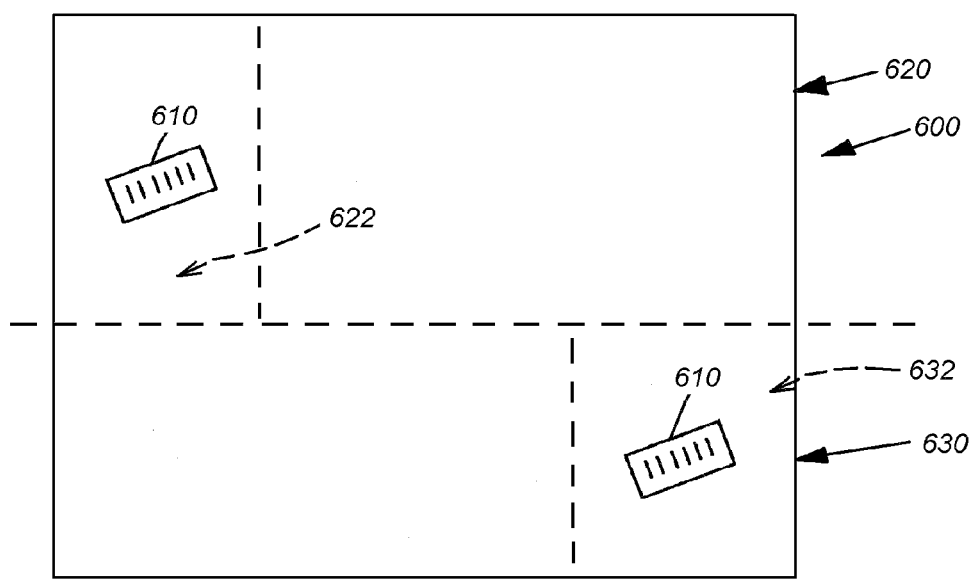
FIG. 6 is a diagram of an acquired image of an exemplary object including a discrete exemplary ID located within an overlap region within each discrete field of view portion of the illustrative vision system and FOVE of FIG. 1.
Figure 7:
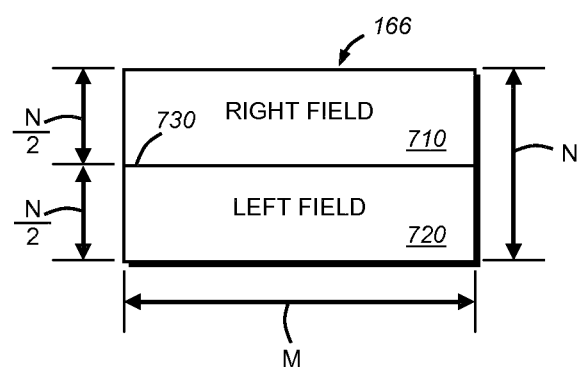
FIG. 7 is a diagram of an exemplary sensor divided between an upper strip that images the right field of view and a lower strip that images the left field of view based upon the division of the field of view provided by the illustrative FOVE of FIG. 1.

Reference is now made to FIGS. 5-7, which show the resulting image received by the sensor based upon the optical arrangement of the FOVE according to the illustrative embodiment. As shown in FIG. 5, the resulting image 500, in which the overall width of the field of view is represented by a ruler 510 includes a top portion 520 that constitutes the right side (with ruler inch-gradations 1-9) and a bottom portion that constitutes the left side (with ruler inch gradations 6-14). A narrow blended horizontal dividing line (in the region of dashed line 540) is depicted between the image strips 520 and 530. This is a small region of optical overlap along the vertical direction that can vary in size based in part upon the degree of vertical tilt of the crossing mirrors 220, 222. As shown, the upper image strip 520 includes an ID 550 within its full field of view. Likewise, the lower image strip 530 also includes a separate ID 552 within its full field of view. Both IDs provided across a wide field of view have been effectively imaged and the overall height dimension has been reduced to minimize excess information in the height direction while still providing sufficient space to fully image the ID. As described above, this narrowed height serves to reduce the number of image frames that can capture the same ID, thereby reducing the risk of double readings of the same object.

The horizontal overlap is represented by the occurrence of inch gradations 6-9 in both the upper and lower image strips 520 and 530, respectively. This distance (about 3-4 inches) is sufficient to ensure that a centered ID of a certain size (e.g. 2-3 inches) is fully captured in at least one of the image strips 520, 530. An example of a centered ID 610 residing in the overlap region of each strip is shown in the diagram 600 of FIG. 6. This ID 610 is positioned similarly to the ID 158 in FIG. 1. In the diagram of FIG. 6, the ID 610 occurs in the left hand overlap region 622 of the upper strip 620. Likewise, in the lower strip 632, the centered ID 610 occurs in the right hand overlap region 632. As described, this region ensures that an ID will fall fully into at least one of the two strips so as to ensure positive identification by the vision system.

Briefly, FIG. 7 shows a conventional camera sensor 166 as described above. The transmitted light from the FOVE reaches the sensor, through the lens so as to define the depicted upper strip 710 and lower strip 720, in which the right side is radiated on the upper strip to be captured by its respective pixels, while the left field is radiated onto the lower strip to be captured on its respective pixels. A relatively narrow vertical overlap band can be defined at the strip boundary 730, where both the left and right fields are deposited. This information can be discarded by the vision system process. Alternatively, the optics of the mirrors can be arranged to define a dark band over a few rows of pixels to avoid confusion. More generally, the FOVE allows a sensor with an M (width)×N (height) pixel array to operate as a narrower 2M×N/2 sensor with no loss of resolution within the imaged area.

Figure 8:
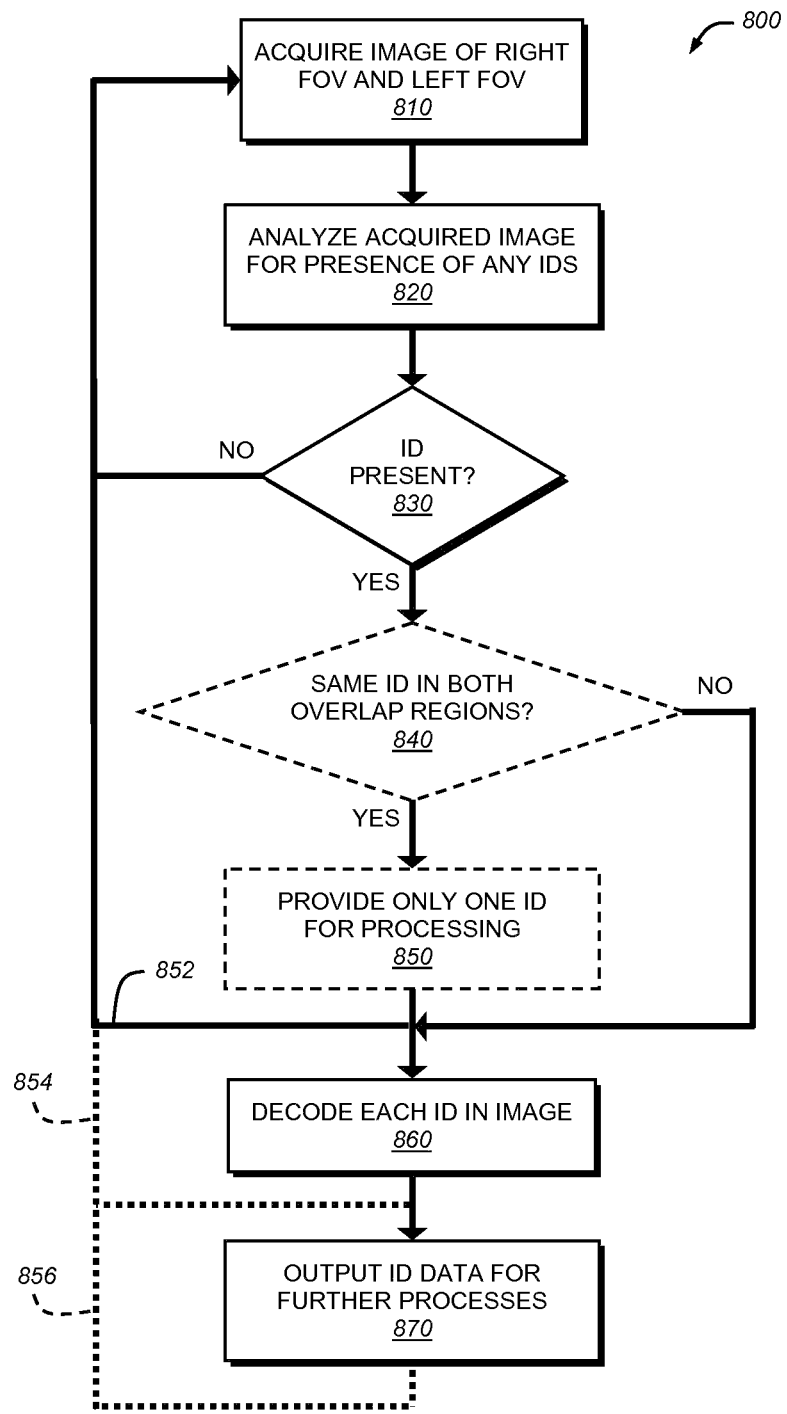
FIG. 8 is a flow diagram of a process for acquiring and decoding IDs using a vision system/ID reader including the illustrative FOVE of FIG. 1.

Reference is now made to FIG. 8 that describes a basic procedure 800 for locating and decoding IDs (or other features of interest) across an expanded width using a vision system with an FOVE according to an illustrative embodiment. In each image frame (depending upon the camera frame rate), the system acquires an image frame, which includes an upper strip and a lower strip (step 810). While not shown, image acquisition can be triggered based upon a presence sensor (e.g. a photodetector, line encoder or vision-system based detector) that senses and/or computes when an object comes into the field of view of the vision system. At such time the system begins acquiring image frames of the object. Each acquired image is then passed to an ID feature search and analysis process 820. This process searches the whole image without regard to its stripped nature for any ID-like features and returns likely candidates for further processing, until features with reasonably high confidence are provided for decoding in a further process. The ID feature search/analysis and decoding application(s) (i.e. software consisting of a non-transitory computer-readable medium of program instructions and/or hardware) to which the image data is directed can be any acceptable ID feature search, analysis and/or decoding application. The search for ID candidates can also be handled by a separate process or processor from decoding (which can be handled by a decoding DSP). Notably, because of the appropriately sized field of view with overlap region, the image can be processed free of any need to "stitch together" portions of it so as to provide a complete ID. Rather, a complete ID is expected to reside in some portion of the overall image and can be located by directly searching the image.

A variety of commercially available software and/or hardware systems can be employed to search analyze and decode IDs and other features of interest in an image frame as described herein. For example, such systems are available from Cognex Corporation of Natick, Mass.

Further in the procedure 800 if no IDs are located in the acquired image frame by the search process 820, then the overall procedure 800 returns via decision step 830 to await the next acquired image frame in step 810. Conversely if any IDs are located in the image frame, then the decision step 830 branches to perform further process. An optional decision step 840 can determine whether the same ID exists (completely) in both the upper and lower overlap region. If so, it can filter the data to pass only one instance of the ID to speed processing (step 850).

Once ID data has been located and passed to further processing (that can be performed by downstream hardware and/or applications), the procedure 800 can branch back to step 810 to await the next set of image data for search and analysis (branch). Optionally, as indicated by dashed lines 854 and 856, branching back to step 810 can occur later in the process.

After providing ID data, the procedure 800 then decodes the located IDs using conventional or customized processes in step 860. The decoded data is then output to be stored and/or used by further processes in step 870.

Figure 9:
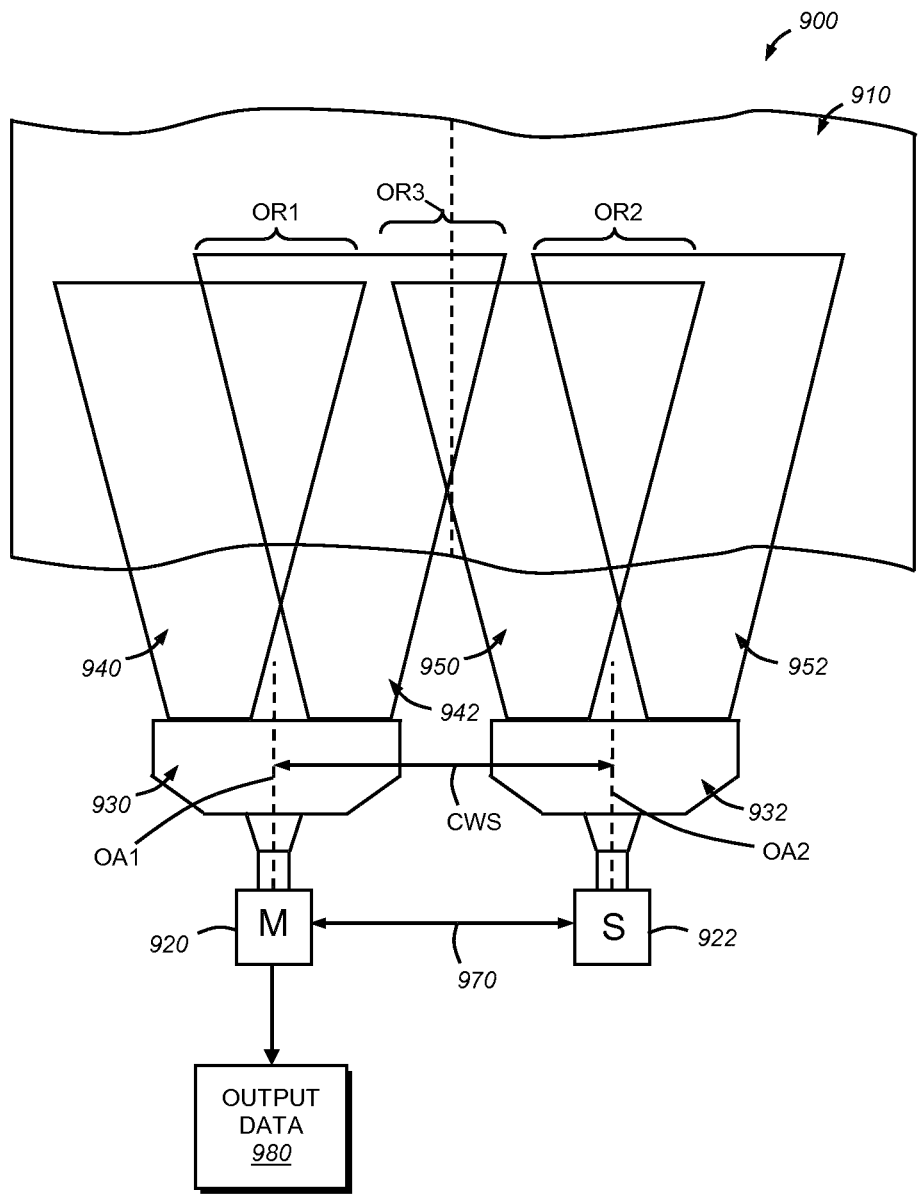
FIG. 9 is a top view of an interconnected arrangement of a plurality of ID readers to image a wide field of view each employing an illustrative FOVE according to an illustrative embodiment.

In certain applications, it can be desirable to increase the width of the field of view even further without loss of resolution within the imaged area. As shown in FIG. 9, an arrangement 900 allows a wide line 910 to be imaged free of loss of resolution within the imaged area. In this embodiment, two vision system camera assemblies 920 and 922 are provided in a side-by-side arrangement at an appropriate widthwise spacing CWS between respective optical axes OA1 and OA2. Each camera assembly 920, 922 includes a respective FOVE 930, 932, which can be constructed and arranged in accordance with the embodiment of FIGS. 1-4A described above. Each camera assembly 920, 922 and respective FOVE 930, 932 is mounted on an appropriate bracket assembly (not shown). The FOVE 930 defines a widened overall field of view with a left field 940 and a right field 942, which appears on the camera sensor as a pair of stacked strips as described above. The two fields 940, 942 include an overlap region OR1 sized to ensure inclusion of the largest feature of interest therein. Likewise the adjacent FOVE 932 defines a widened overall field of view with a left field 950 and a right field 952, which appears on the camera sensor as a pair of stacked strips as described above. The two fields 950, 952 also include an overlap region OR2 that is sized to ensure inclusion of the largest feature of interest therein. The spacing CWS between cameras 920, 922 is chosen to generate a third overlap region OR3 that is sized and arranged to ensure that the largest feature of interest resides fully within at least one adjacent field of view 942, 950 of a respective camera 920, 922.

There are a variety of techniques for searching and analyzing the received image data of the two cameras. In general a procedure 800 can be carried out within the processor associated with (or operatively connected with) one of the cameras using a master-slave interconnection 970 between cameras (commercially available on a variety of camera units, such as certain units manufactured by (Cognex Corporation). In such an arrangement, acquisition of concurrent image frames in both the master (M) and slave (S) cameras is triggered by the master (camera 920 herein designated M) and handling of image data is controlled by the master. In other arrangements, both the processors of the master and the slave can operate to locate and analyze IDs or other features of interest. One or both of the cameras are used to output resulting data (block 980) as described above.

Figure 10:
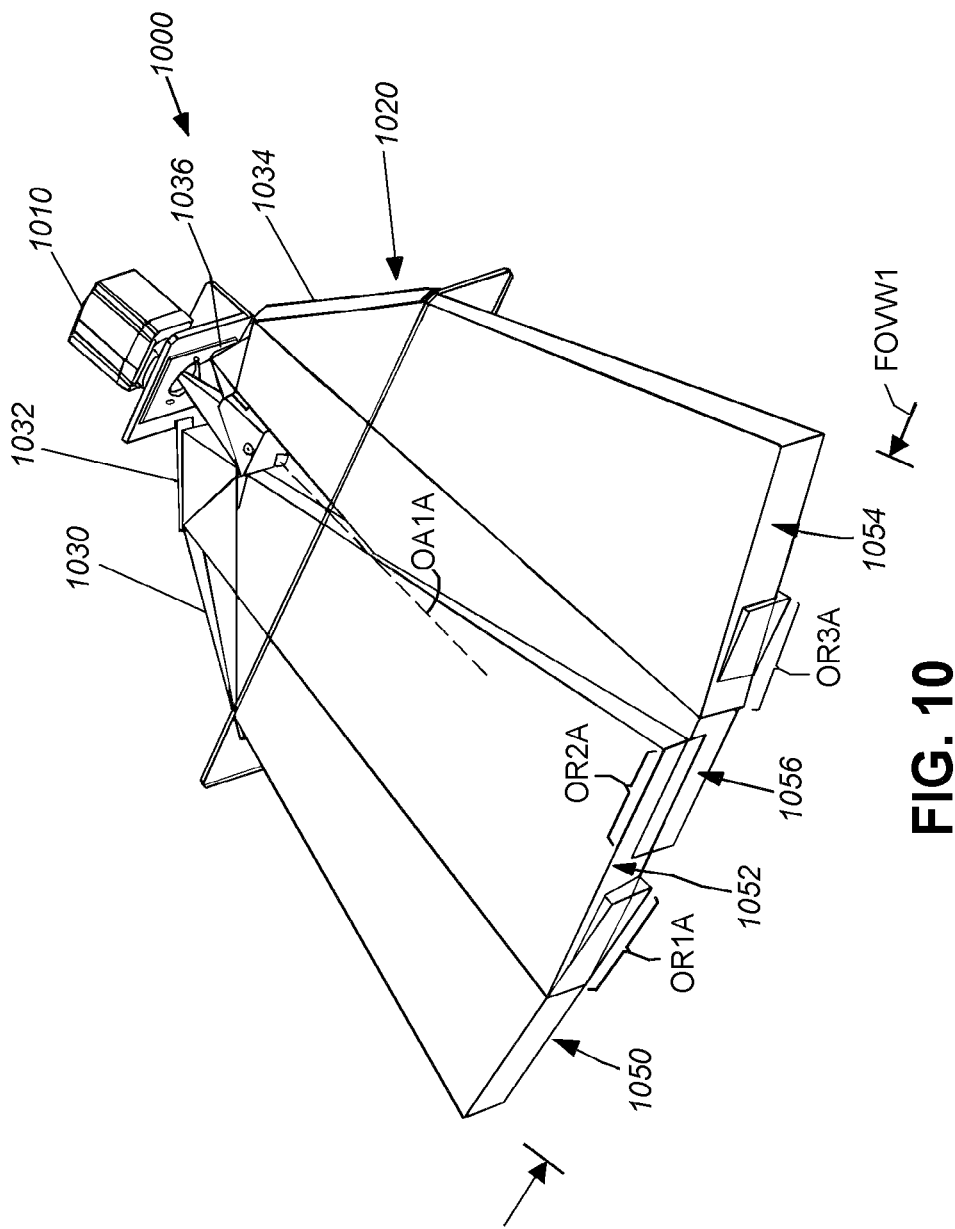
FIG. 10 is a perspective view of a vision system/ID reader including a FOVE according to an alternate embodiment in which four discrete strips relative to the image sensor.

In another embodiment, a wider field of view than that obtained with the FOVE of FIGS. 1-4A can be achieved using a single camera assembly 1010 in the arrangement 1000 of FIG. 10. As shown, the FOVE 1020 (with shell removed for clarity) includes four discrete outer mirrors, with two positioned on each side of the optical axis OA1A 1030, 1032 and 1034, 1036. Each mirror is oriented at a discrete angle with respect to the optical axis, with the outermost mirror pair 1030 and 1034 having a smaller angle than the innermost mirror pair 1032 and 1036. The relative angles of each of the outers mirrors 1030, 1032, 1034 and 1036 are each highly variable and in general are constructed and arranged to define the four fields of view 1050, 1052, 1054 and 1056, respectively that span the width of an expanded field of view FOVW1. Adjacent fields of view have appropriately sized overlap regions for reasons described above. That is, adjacent fields 1050 and 1052 define overlap region OR1A, fields 1052 and 1056 define overlap region Or2A and fields 1056 and 1054 define overlap region OR3A. The outer mirrors can be located at higher or lower positions vertically with respect to the optical axis OA1A. They reflect light from the scene into a "beam splitter" That can consist of four stacked, angled and vertically tilted mirrors arranged similarly to that of the FOVE described in FIGS. 1-4A. The resulting split image provides four stacked strips upon the sensor of the camera 1010. In an embodiment, the strips divide the image of an M×N sensor into a 4M×N/4 wide image. Desirably, the arrangement of the outer mirrors and beam splitter mirrors allows each image strip to be substantially aligned (along the horizontal plane) with the optical axis for minimum distortion thereof.

This approach is effective so long as the line speed is slow enough and/or the frame rate of the camera is high enough to ensure a relatively complete ID or other feature of interest can be acquired in the relatively narrow-height strip of the expanded field of view.

Figure 11:
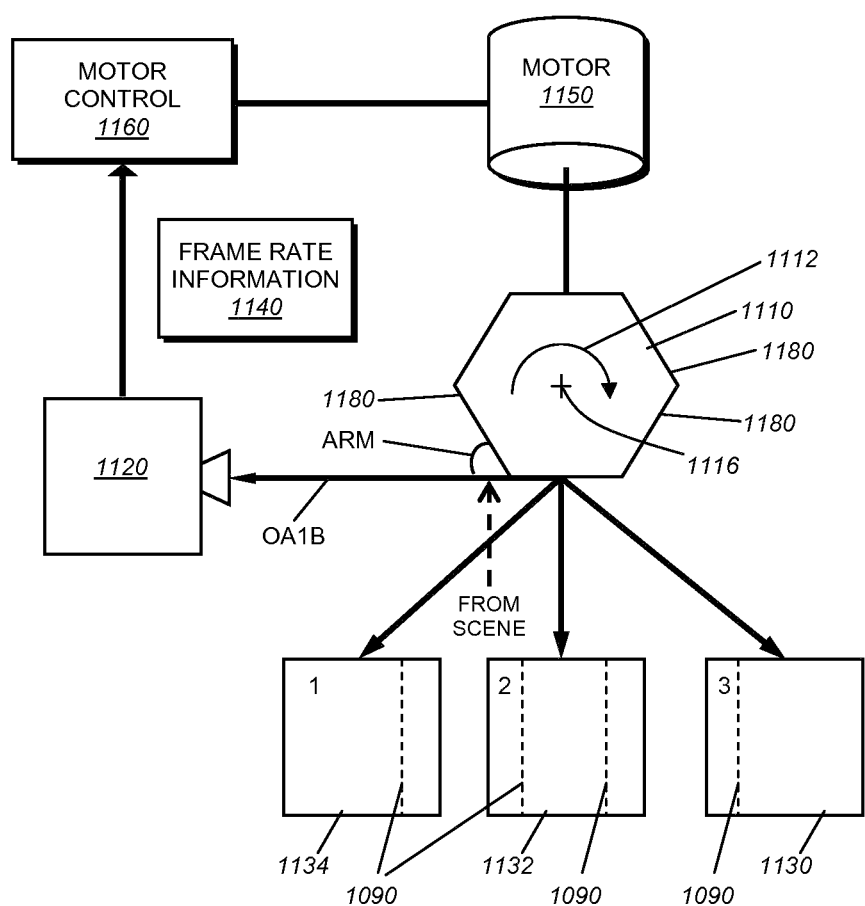
FIG. 11 is a schematic diagram of a rotating, polygonal mirror used to acquire a plurality of image frames across an expanded field of view.

In further alternate embodiments, an FOVE can be implemented using a moving mirror arrangement in optical communication with the camera assembly. As shown in the schematic diagram of FIG. 11, a polygonal, rotating (curved arrow 1112) mirror 1110 can be employed to provide a sequence of full resolution images across the width of the object having a wider profile that the original field of view than the camera assembly 1120. The rotation is along an axis 1116 generally perpendicular to the horizontal plane of the field of view though the optical axis OA1B. Each reflecting surface on the polygonal mirror is typically (but not necessarily) substantially perpendicular to the horizontal plane and parallel to the axis of mirror rotation 1116. In general, a sequence of images 1130, 1132, 1134 is acquired in (for example) a sequence of images to be taken which look at neighboring regions of the overall width of the scene. In general, frame rate information 1140 can be transmitted from the camera assembly to synchronize operation of the mirror drive motor 1150 under control of a motor control circuit 1160 of appropriate configuration. For example, a stepper motor can be used to accurate step through a sequence of positions that place each of the mirror surfaces 1180 at an appropriate angular orientation to reflect back an optically aligned (i.e. aligned with the camera optical axis OA1B) image of a portion of the width. In an embodiment, the mirror has a regular polygon shape and the angular orientation of each surface (angle ARM) varies upon acquisition of each image frame so as to achieve a sequence of images across the width of the scene. In other words Frame 1 is taken at a 38-degree relative angle ARM, frame 2 is taken at a 45 degree relative angle ARM and frame 3 is taken at a 52 degree angle. In another embodiment, the polygon is irregular ad the motor steps stop at regular degree intervals, in synchronization with the frame rate so that each step exposes a slightly differently angled face of the polygon to the optical axis. This synchronization essentially generates an approximately constant pattern of varied angular orientations in a sequence. Each image can define an appropriate overlap region along an adjacent edge with another image, the size of which in the widthwise direction is sufficient to ensure that an ID or other feature of interest fully resides within the overlap region of one of the images. The overall width of the field of view is highly variable. Each image can be independently search and analyzed for IDs or other features without regard to other images in the sequence (i.e. free of the need to stitch together the overall image). Thus, the motion of the object in the drive direction should not affect the ability of the system to resolve any IDs so long as the full width of the object can be imaged while an ID remains within the height of at least one of the images. In another embodiment, where the frame rate is sufficiently high, the mirror can be slightly asynchronous with frame rate and a large sequence of images at a number of differing orientations can be acquired in a possibly random sequence. In any embodiment, a boundary can limit the maximum field of view to the desired width so that only light from the object within the defined field reaches the camera.

In another embodiment, an oscillating mirror (not shown) can be used as a "moving" mirror. The oscillating mirror can be a micro mirror that moves (rotates along an axis perpendicular to the horizontal plane) between different angular orientations with respect to the camera optical axis so that different portions of the overall field of view are imaged. The motion of the mirror can be synchronous or asynchronous with respect to the object.

It should be clear that the FOVE according to the various embodiments herein provides a desirable system and method for expanding a field of view in a vision system that searches for, and analyzes, features of interest, such as barcodes/IDs, without loss of desired resolution. The implementation requires little or no modification to existing camera optics, hardware or software and is relatively straightforward to implement in a production environment. Desirably, various implementations of the FOVE maximize the use of a conventional format sensor by narrowing the effective height and widening the effective width to a dimension more suited to scanning a wide, moving line.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while the features of interest described according to illustrative embodiments are IDs/barcodes (e.g. any form/type of one-dimensional, two-dimensional, etc.), the principles of the embodiments herein can be used to analyze and process a variety of features of interest, including, but not limited to, various forms of printed or applied fiducials, alphanumeric, graphical, numeric or other written characters, proof marks, and the like. In addition the principles herein can be employed to analyze and process other forms of features that may occur periodically across portions of an expanded width of a field of view. For example, while the FOVE according to various embodiments herein is described as expanding the field of view of a scene in the horizontal or widthwise direction, it is expressly contemplated that a field of view can be expanded by the FOVE in a vertical direction, or in an oblique orientation between horizontal and vertical. Also while various embodiments generate discrete strips on the sensor from associated fields of view other geometric shapes are contemplated, so long as a feature can be fully imaged in at least one portion of the projected field. Likewise, the projected geometric features (e.g. strips) on the sensor need not be symmetrical with respect to each other in height and/or width. Also, while the outer mirrors of the illustrative FOVE are shown as generally vertical, and the reflecting surfaces of the inner mirrors of the beam splitter are shown with a slight vertical tilt, it is contemplated that the outer mirrors can define a vertical tilt in the alternative or both the outer and inner mirrors can define a vertical tilt as appropriate to generate the desired strips (or other geometric projections) on the sensor. Likewise, while the strips are stacked "vertically" it is contemplated that a horizontal/side-by-side stacking of strips (or other geometric shapes) can occur at the sensor based upon a projection of the imaged scene's multiple fields of view. Moreover, the term "process" or "processor" as used herein should be taken broadly to include both hardware and software operations (and various combinations thereof) that can be performed with one or more of the depicted functional blocks or divided in whole, or in part amongst the various depicted functional blocks. Accordingly, this description is meant to be taken only by way of example, and not to otherwise limit the scope of this invention.

What is claimed is:

1. A system for expanding a field of view of a scene imaged by a vision system camera having an image sensor, the system being constructed and arranged to search and analyze features of interest in the scene comprising:
    a first outer mirror oriented at an acute angle with respect to an optical axis of the camera and a second outer mirror oriented at an opposing acute angle with respect to an opposing side of the optical axis; and
    a beam splitter located forward of the first outer mirror and the second outer mirror in a direction taken from the vision system camera, the beam splitter including a first reflecting surface and a second reflecting surface wherein the first outer mirror and first reflecting surface are arranged to direct a first field of view from the scene along the optical axis to the sensor and the second outer mirror and second reflecting surface are arranged to direct a second field of view from the scene along the optical axis to the sensor,
    wherein the first outer mirror and the second outer mirror are directed to receive light from different widthwise portions of a field of view that includes the first field of view and the second field of view.

2. The system as set forth in claim 1 wherein the first outer mirror and the second outer mirror are positioned at offset vertical positions.

3. The system as set forth in claim 2 wherein the first reflecting surface is arranged with a first vertical tilt and the second reflecting surface is arranged with a second, opposing, vertical tilt.

4. The system as set forth in claim 3 wherein the first reflecting surface and the second reflecting surface define crossing mirrors stacked vertically and defining an approximate crossing line passing approximately through the optical axis.

5. The system as set forth in claim 1 wherein the first field of view and the second field of view overlap by a predetermined overlap distance along a horizontal direction.

6. The system as set forth in claim 5 wherein the predetermined overlap distance is at least as large as a largest feature of interest along the horizontal direction to be searched by the vision system camera.

7. The system as set forth in claim 6 wherein the feature of interest is a symbology code, the system further comprising a symbology code decoding system that receives information related to located symbology codes from the vision system camera and outputs code data to a further interconnected process.

8. The system as set forth in claim 7 wherein the symbology code is located on an object moving on a conveyor through the scene.

9. The system as set forth in claim 8 wherein the symbology code comprises a one-dimensional barcode approximately oriented in the horizontal direction on an object.

10. The system as set forth in claim 1 wherein the sensor defines a predetermined M (width)×N (height) pixel resolution that compresses a roughly square geometry.

11. The system as set forth in claim 10 wherein the M (width)×N (height) pixel resolution defines at least one of 1024×768 pixels, 2048×384 pixels and 2048×768 pixels.

12. The system of claim 1 wherein the first field of view is at least in part separated from the second field of view at the scene along a horizontal direction.

13. The system of claim 1 wherein the first outer mirror, the second outer mirror and the beam splitter are arranged to project each of the first field of view and the second field of view in a vertically stacked relationship of strips at the sensor.

14. A method for expanding a field of view of a scene imaged by a camera of a vision system, the camera having an image sensor, and the system being constructed and arranged to search and analyze features of interest in the scene comprising the steps of:
    directing light from the scene through a first outer mirror oriented at an acute angle with respect to an optical axis of the camera and a second outer mirror oriented at an opposing acute angle with respect to an opposing side of the optical axis; and
    with a beam splitter located forward of the first outer mirror and the second outer mirror in a direction taken from the vision system camera, the beam splitter including a first reflecting surface and a second reflecting surface, projecting a first field of view from the scene through the first outer mirror, to the first reflecting surface, and then along the optical axis to the sensor and projecting a second field of view from the scene through the second outer mirror, to second reflecting surface, and then along the optical axis to the sensor,
    wherein the first outer mirror and the second outer mirror are directed to receive light from different widthwise portions of a field of view that includes the first field of view and the second field of view.

15. The method of claim 14 wherein the step of projecting the first field of view and the step of projecting the second field of view includes separating the first field of view at least in part from the second field of view relative to the scene along a horizontal direction, and projecting a stacked relationship of strips that respectively define the first field of view and the second field of view at the sensor.

16. The method as set forth in claim 15 wherein the step of separating first field of view and the second field of view overlap by a predetermined overlap distance along the horizontal direction.

17. The method as set forth in claim 15 wherein the predetermined overlap distance is at least as large as a largest feature of interest along the horizontal direction to be searched by the vision system camera.

18. The method as set forth in claim 17 further comprising, with a vision system application, searching and analyzing an overall image from the sensor, and locating from the overall image, the features of interest therein free of stitching together image information from the strips.

19. The method as set forth in claim 15 wherein the step of projecting the stacked relationship includes stacking the strips vertically at the sensor.

20. The method as set forth in claim 15 wherein the features of interest comprise symbology codes located on an object moving relative to the scene.

21. The method as set forth in claim 20 wherein at least one of the symbology codes comprises a one-dimensional-type barcode oriented to extend approximately along the horizontal direction.

\* \* \* \* \*